Jan. 8, 1935. R. M. REEL 1,987,350
PNEUMATIC TIRE CONSTRUCTION
Filed Nov. 18, 1933
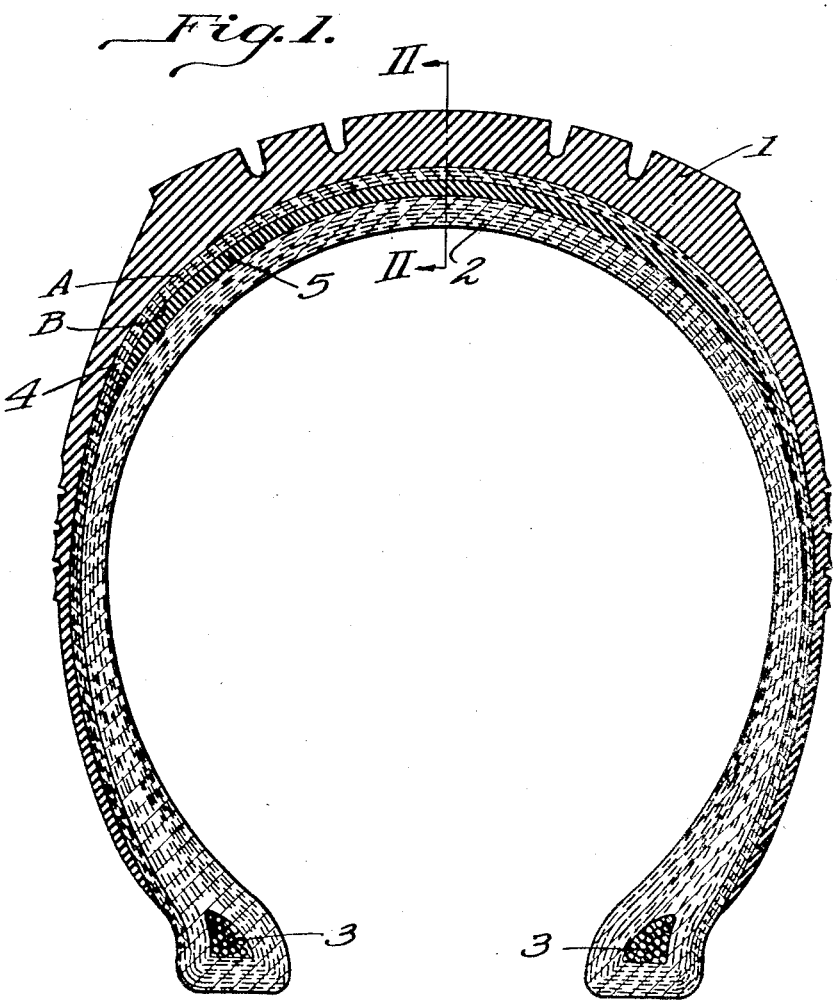
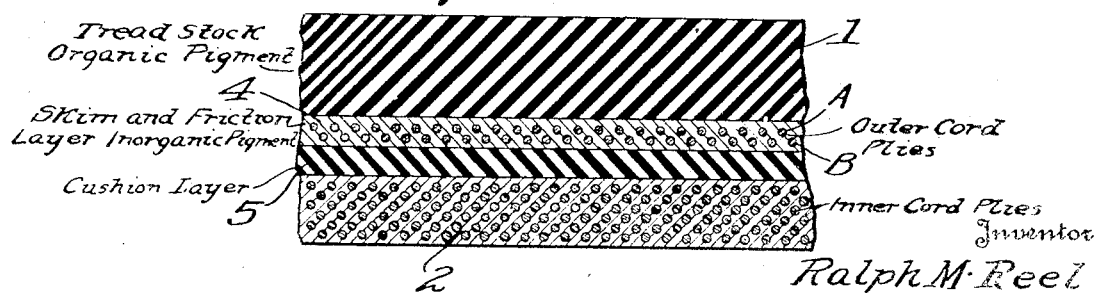

Patented Jan. 8, 1935

1,987,350

UNITED STATES PATENT OFFICE 1,987,350

PNEUMATIC TIRE CONSTRUCTION

Ralph M. Reel, Newark, Ohio, assignor to The Pharis Tire and Rubber Company, Newark, Ohio, a corporation of Ohio Application November 18, 1933, Serial No. 698,674

6 Claims. (Cl. 152—13)

This invention has for a primary object the provision of a structurally improved fabricated casing for pneumatic motor vehicle tires wherein provision is made for effecting a more permanent union between the adjoining surfaces of the fabric carcass of such a tire and the rubber tread thereof, whereby to avoid separation of these ply tire layers, and at the same time to prevent the development of deleteriously high internal temperatures within the tire during use thereof. It has been proposed heretofore to construct tire casings to provide one or more intermediate layers or plies of compounded rubber between the fabric cord carcass and the outer tread layer for the principal purpose of reducing the internal temperatures of such tires during their normal operation. It is customary to compound the rubber of the tread layer with an organic filler or pigment, such as channel gas black, in the proportion of approximately forty to fifty parts by weight of gas black to 100 parts of rubber. This material while offering high resistance to abrasion or wear is a relatively poor conductor of heat and to overcome or dissipate the interior heat developed during tire usage, the prior art has resorted to the use of one or more internal rubber plies, arranged between the outer tread and the cord carcass, and which intermediate ply or plies have been compounded with an inorganic filler, such as zinc oxide, in proportions of approximately 20 to 50 parts by weight of the filler to 100 parts by weight of rubber. In such prior tires, the heat which is generated at the tread of the tire is in a large measure insulated from the carcass by the heat insulating characteristics of the tread, but such heat as reaches the carcass or is generated therein beneath the tread is absorbed by the intermediate layer or layers of rubber which are better conductors of heat than the outer tread and which serve to dissipate the heat set up therein due to the flexing and contortions of the tire.

The employment of the intermediate ply or plies produces a plurality of adjoining surfaces between the plies which are apt to separate after some use of the tire and thereby shorten its effective period of usefulness. Also, it has been observed that when such intermediate ply or plies are not employed and the tread extended directly into contact with the cord carcass, it is also difficult to secure a permanent and lasting union at the interfacing surfaces of the compounded rubber tread and the fabric carcass. In fact, most tests disclose that shoulder separation starts at the union between the cord fabric and rubber compound at their points of juncture.

In accordance with the present invention, I use a rubber compound on the outer ply or plies of the cord carcass which adjoins the rubber tread and which compound contains approximately the same volume loading of pigment as the thread stock, except that the pigment used in the compound applied to the plies of the fabric carcass shall be one which has a better heat conductance than the carbon black pigment employed in the tread layer. Such pigments as antimony sulphide, zinc oxide, calcium carbonate and barium sulphate have been found to be suitable in the rubber compound applied to the carcass plies.

The present invention resides in the discovery that by impregnating and surrounding the outer plies of the cord carcass with a rubber compound stiffened by the employment of an inorganic pigment to the extent that it nearly approaches the customary stiffness of the cotton cord, the separation tendency between the outer rubber layer comprising the tread of the tire and the cord carcass will be materially reduced. Also, I have found that to prevent generation of excessive heat and also to remove that which is formed to an extent where it will not be harmful, the pigment employed in the rubber compound surrounding the cord plies should not be the same as that used in the tread layer. So far as I am aware, it is novel in the art of tire manufacture to load the friction and skim coat of rubber on the outer ply or plies of a cord carcass with an inorganic pigment in an amount varying between 22% and 30% by volume (not by weight) of the rubber used, in order that this compound rubber may approach more nearly the stiffness of the cord fabric.

A further understanding of the invention may be obtained by reference to the following description and the accompanying drawing, wherein:

Fig. 1 is a vertical transverse sectional view taken through a portion of a tire casing constructed in accordance with the present invention;

Fig. 2 is an enlarged vertical sectional view on the line II—II of Fig. 1.

In the tire disclosure in the accompanying drawing, there is provided the usual outer tread 1 which is of a suitable tough, wear resisting, rubber composition. The tread stock may be of standard composition, in that it contains approximately 42 parts by weight of carbon black, or channel gas black, per 100 parts of rubber. Also, the tread stock may contain the usual vulcanizing agents, accelerators and antioxidants as is customary in tire manufacture. Below or within the tread layer, there is arranged the usual cord carcass 2, which is formed in the customary manner by superimposing layers of treated cords or fabric, which are worked about the bead portions 3. In the present invention, the two outer plies of the cord carcass, indicated at A and B are embedded in friction and skim coats of compounded rubber indicated at 4 and between this skim coating and the inner cord plies of the carcass, the usual squeegee or cushion rubber ply 5 may or may not be inserted so as to lie between the two outer plies A and B and the rest of the inner plies. My invention particularly resides in the composition of the skim coating applied around the outer carcass plies A and B, as above indicated. The coating 4 contains approximately the same volume loading of pigment as the tread stock 1, except that the pigment when used shall be one which has a better heat conductance than the carbon black used as a pigment in the tread stock. I have found such pigments as antimony sulphide, zinc oxide, calcium carbonate (whiting), and barium sulphate (blanc fixe) are suitable as fillers in the coating 4. So far as I am aware, it is novel in this art to load the friction and skim coating 4 with an inorganic pigment to the extent that such pigment is present in proportions varying between 22% and 30% by volume to 100% by volume of rubber. I know that it has been proposed to employ intermediate plies of compounded rubber between the skim coating of a cord carcass and the tread stock wherein inorganic pigments have been employed to an extent of approximately 50% by weight (about 9% by volume) to the rubber so employed, whereas in contrast with this previous practice, the present invention compounds the cord skim coating, not an intermediate ply, with a much higher amount of an inorganic pigment so that the stiffness of the skim coating more nearly approaches that of the cord fabric.

The coating 4 is in direct contact with the tread stock, there being no intervening cushions or intermediate plies of rubber. If desired, however, the usual cushion or squeegee may be used between the outer cord plies A and B of the cord carcass and the inner plies. The principal feature of the present invention is the fact that the compound comprising the coating 4 is loaded to contain approximately the same volume of pigment as the tread and that the pigment is an inorganic one and a better heat conductor than channel gas black.

Tests have disclosed that the present invention tends to overcome what is known as shoulder separation, which usually starts at the union between the cord fabric and rubber compound along their adjoining surfaces. By stiffening the compound 4 with the large amount of pigment so that it more nearly approaches the stiffness of the cotton cord, this separation tendency is materially reduced. Also, to prevent generation of excessive heat and to rapidly remove that which is formed, the pigment in the coating 4 should preferably be of the inorganic character above defined.

If desired, the outer plies of cord A and B may be separated to a greater extent than the inner cord plies in order to allow the rubber compound 4 to pass through and entirely surround and encase the cord plies A and B.

Although I have illustrated only one form which the invention may assume and have described in detail only a single application thereof, it will be apparent to those skilled in the art that it is not so limited, but that various minor modifications may be made therein without departing from the spirit of the invention or from the scope of the appended claims.

What is claimed is:

1. In a pneumatic tire construction, a plurality of plies of cord fabric forming the carcass of the tire, a friction and skim coating of rubber on the outer cord ply composed of rubber and an inorganic pigment in which coating the outer cord ply is embedded, and a tread layer of rubber compounded with an organic pigment and vulcanized to the cord carcass and the friction and skim coating applied thereto, said skim coating having a stiffness approximating the stiffness of the cord ply embedded therein.

2. In a pneumatic tire construction, a carcass composed of a plurality of plies of cord fabric, a separate layer of rubber of relatively high thermal conductivity in which the outer plies of the cord carcass are embedded, and a tread directly vulcanized to said first-named layer of rubber, said tread beng compounded of rubber of relatively high abrasive resisting properties of relatively low heat conductivity as compared with the first-named rubber layer, said layer of high thermal conductivity having a stiffness approximately equal to the cord embedded therein.

3. In a pneumatic tire construction, a carcass composed of a plurality of cord plies, a tread composed of rubber compounded with an organic pigment to possess relatively high abrasive resisting properties but of relatively low heat conductance, and an intermediate friction coating of compounded rubber in which the outer plies of the cord carcass are embedded, said intermediate layer containing approximately the same volume of pigment as the tread layer, the pigment of the intermediate layer being one of a group composed of antimony sulphide, zinc oxide, calcium carbonate and/or barium sulphate, said intermediate friction coating having relatively the same stiffness as the cord fabric embedded therein.

4. In a pneumatic tire construction, a carcass composed of a plurality of cord plies, a tread composed of rubber highly compounded with an organic pigment, and a facing layer of rubber compounded with an inorganic pigment in substantially the same proportions as the tread layer with the organic pigment and to which the tread layer is vulcanized, the outer plies of said cord carcass being embedded in said facing layer, said facing layer and said cord embedded therein having approximately the same stiffness.

5. In a pneumatic tire construction, a carcass composed of a plurality of cord plies, a tread composed of rubber highly compounded with an organic pigment, a facing layer of rubber compounded with an inorganic pigment in substantially the same proportions as the tread layer with the organic pigment and to which the tread layer is vulcanized, the outer plies of said cord carcass being embedded in said facing layer and having the same stiffness as said facing layer, and a cushion layer of rubber arranged between the outer plies of the cord carcass and the inner plies thereof.

6. In a pneumatic tire construction, a plurality of plies of cord fabric constituting the carcass of the tire, the outer ply of fabric extending from bead to bead and being spaced from the balance of the carcass by a layer of cushion rubber of substantial thickness and a tread layer of rubber vulcanized to the carcass, the cords of the outer ply being spaced apart and around by rubber having the same stiffness compounded with 22% to 30% by volume with an inorganic pigment whereby adhesion is maintained between the tread and the carcass without the employment of intervening rubber layers.

RALPH M. REEL.